United States Patent
Meter

(10) Patent No.: US 8,826,860 B2
(45) Date of Patent: Sep. 9, 2014

(54) METHOD FOR THE TREATING OF PRODUCTS, SUCH AS EGGS TO BE HATCHED, WITH A CONDITIONED GAS STREAM, AND CLIMATE CHAMBER FOR CARRYING OUT THE METHOD

(75) Inventor: Tjitze Meter, Veenendaal (NL)

(73) Assignee: Hatchtech Group B.V., Veenendaal (NL)

(*) Notice: Subject to any disclaimer, the term of this patent is extended or adjusted under 35 U.S.C. 154(b) by 594 days.

(21) Appl. No.: 13/000,039

(22) PCT Filed: Jun. 18, 2008

(86) PCT No.: PCT/NL2008/050394
§ 371 (c)(1),
(2), (4) Date: Jan. 3, 2011

(87) PCT Pub. No.: WO2009/154439
PCT Pub. Date: Dec. 23, 2009

(65) Prior Publication Data
US 2011/0107978 A1    May 12, 2011

(51) Int. Cl.
*A01K 41/06* (2006.01)
*A01K 41/02* (2006.01)

(52) U.S. Cl.
USPC .......................................... 119/300; 119/325

(58) Field of Classification Search
USPC ................................. 119/300, 322, 324–326
See application file for complete search history.

(56) References Cited

U.S. PATENT DOCUMENTS

| | | | |
|---|---|---|---|
| 2,654,345 A | 10/1953 | Edwards | |
| 4,957,066 A * | 9/1990 | Dambre | 119/328 |
| 5,568,791 A * | 10/1996 | Dratt | 119/300 |
| 6,708,755 B1 * | 3/2004 | Meter | 165/53 |
| 7,021,552 B2 * | 4/2006 | Meter | 236/2 |

* cited by examiner

*Primary Examiner* — Kristen C Hayes
(74) *Attorney, Agent, or Firm* — Jordan IP Law, LLC; Todd A. Vaughn

(57) ABSTRACT

A climate chamber and method for treating products, such as eggs to be hatched, with a conditioned gas stream. The climate chamber includes a substantially closed compartment having two opposing lateral walls provided with one or more passages, and a substantially closed channel which extends around the outside of the compartment and connects one of said lateral walls to the other of said lateral walls in order to form together with the compartment a substantially closed circuit. The product is placed in the climate chamber, and then the conditioned gas is circulating through the circuit. The direction in which the conditioned gas stream is circulated through the circuit is reversed repeatedly.

15 Claims, 6 Drawing Sheets

METHOD FOR THE TREATING OF PRODUCTS, SUCH AS EGGS TO BE HATCHED, WITH A CONDITIONED GAS STREAM, AND CLIMATE CHAMBER FOR CARRYING OUT THE METHOD

CROSS REFERENCE TO PRIOR APPLICATIONS

The present application is a National Stage Application of PCT International Application No. PCT/NL2008/050394 (filed on Jun. 18, 2008), under 35 U.S.C. §371, which is hereby incorporated by reference in its entirety.

FIELD OF THE INVENTION

The present invention relates on the one hand to a method for the treating of products, such as eggs to be hatched, with a conditioned gas stream, which method is carried out in a climate chamber, and relates on the other hand to a climate chamber for implementing this method. According to the invention, the climate chamber comprises:
- a substantially closed compartment having two opposing lateral walls provided with one or more passages;
- a substantially closed channel which extends around the outside of the compartment and connects one of said lateral walls to the other of said lateral walls in order to form together with the compartment a substantially closed circuit;

and the gas stream is circulated through the circuit.

BACKGROUND OF THE INVENTION

When treating products with a conditioned gas stream in a climate chamber, it is very important that these products are treated with the conditioned gas stream as uniformly as possible. Various solutions for this are known in the art. It is thus known, for example, to provide in the treatment compartment of the climate chamber fans or otherwise stirring members in order continuously to mix the air in that compartment and thus to ensure that all of the products are treated as uniformly as possible. A further approach is to ensure that the products to be treated are positioned in the compartment in such a way that the flow of air is not excessively impeded, so the air is able to reach all regions.

SUMMARY OF THE INVENTION

In the case of the method in accordance with embodiments of the invention, efforts are made to treat all of the products in the treatment compartment of the climate chamber uniformly by passing the gas stream through the compartment predominantly in one direction, from one lateral wall to the opposing lateral wall. If then the gas stream entering the compartment has uniformly conditioned conditions distributed over the entire wall where the gas stream enters, all of the products will be treated to a high degree uniformly. This allows good results to be achieved.

However, the Applicant has found that in the case of some products, such as hatching eggs, not only uniform treatment of the products relative to one another but also uniform treatment of each product plays an important role. The term "uniform treatment of each product" refers in the present case to the fact that the product to be treated is treated uniformly on all sides. In the case of hatching eggs, this is particularly important with regard to the temperature. It has been found that the temperature of hatching eggs at the side where the air stream flows in, known in sailing terminology as the weather side, differs somewhat from the temperature at the side positioned in the shadow of the inflow side, known in sailing terminology as the lee side.

The Applicant has found that these small differences in temperature adversely affect the development of the embryo. Particularly in the very early phase of development of the embryo, especially during the first 4 to 10 hours, this has been found to have a relatively marked influence. More generally, the entire initial period of the hatching of the eggs, from 0 to approximately 4 days, is very important for the development of the embryo.

However, the Applicant expects these problems also to affect other products. For example, in the case of the ripening of fruit, it is quite conceivable not only for products to be treated uniformly relative to one another—in which case each product is treated the same—but also for each product to be separately subjected uniformly to a specific treatment, such as a gas assembly. In ripening chambers of this type, a gas is often added to influence the ripening process. If the gas assembly does not then access all sides of the product uniformly, the product will not ripen uniformly.

The object of the present invention is therefore to improve the method and the climate chamber in accordance with embodiments in such a way that not only are the products treated uniformly relative to one another but also the uniform treatment of each product separately is further improved, in particular made more homogeneous.

The object of the present invention is therefore to improve the method and the climate chamber in accordance with embodiments in such a way that not only are the products treated uniformly relative to one another but also the uniform treatment of each product separately is further improved, in particular made more homogeneous.

With regard to the method according to the invention, the aforementioned object is achieved in that the direction in which the gas stream is circulated through the circuit is reversed repeatedly, in each case once a reversing time interval has elapsed.

With regard to the climate chamber according to the invention, this object is achieved in that the gas displacement device is provided with a reversing system configured for reversing repeatedly, in each case once a reversing time interval has elapsed, the direction in which the gas stream is circulated through the circuit.

Regularly (meaning both at fixed time intervals as well as at variable time intervals) and repeatedly changing the direction in which the gas stream is circulated through the circuit means that the passing gas stream flows through the product placed in the compartment in each case from a different, opposing side. The length of the reversing time interval can in this case remain constant over the entire treatment time or over a portion of the treatment time, in which case the direction in which the gas stream is circulated is thus reversed periodically, although this reversing time interval can also be variable. It may be conceivable to provide on one or more products sensors which activate the reversing of the gas stream as a function of measured values.

The reversing time interval will depend on the product to be treated. Generally, the reversing time interval will be less than 2.5 hours (i.e. the gap between one reversing action and a subsequent reversing action will be less than 2.5 hours); more particularly, the reversing time interval will generally be less than 1 hour.

For the hatching-out of eggs (although probably also for other products such as fruit and vegetables), the reversing time interval will be at most 30 minutes, preferably at most 20 minutes. Taking account of the delays which play a part in the treatment process, such as the temperature gradient of the product to be treated, the delayed response of used heat exchangers and the delayed response mass of gas which is circulated, the reversing time interval will in practice be at least 1 minute, preferably at least 5 minutes, more preferably at least 7.5 minutes.

With regard to the hatching-out of eggs, the direction of the gas stream will reverse over at least 4 to 10 hours, for example over 1 to 4 days or longer, advantageously at a fixed or variable reversing frequency, and in particular from the start of the treatment. After the first 4 to 10 hours or, if appropriate, after 1 to 4 days, or possibly after a different period of time in the case of other products, the reversing, after a respective reversing time interval, of the direction in which the gas stream is circulated can, if appropriate, be terminated if it serves no further purpose.

According to the invention, it is also advantageous if the gas stream passes through the compartment predominantly from one lateral wall to the other lateral wall. A gas stream having predominantly one clear direction is thus obtained in the compartment.

According to the invention, this can be achieved, in particular, if the opposing lateral walls are configured as a perforated plate provided with a fluid pipe through which a fluid is conveyed, in such a way that each lateral wall forms a heat exchanger with which the temperature of the gas stream passing through said lateral wall can be influenced. Thus, on the one hand, the temperature of the gas stream entering the compartment can be regulated very accurately and, on the other hand, it is possible—by means of the perforations—to cause the gas to enter the compartment in a very uniformly distributed manner or, by contrast, distributed according to a specific pattern.

According to the invention, it is in this case also advantageous if the compartment is divided in the direction of flow into at least two successive subcompartments, if adjacent subcompartments are each separated from one another by a partition wall configured as an aforementioned perforated plate provided with a fluid pipe through which a fluid is conveyed, in such a way that the partition wall forms a heat exchanger with which the temperature of the gas stream passing through the partition wall is influenced, and if the partition wall extends substantially transversely to the direction of flow of the gas stream through the compartment. These partition walls then allow, in each case at the end of a subcompartment, the gas stream to be brought back to a specific desired temperature, thus allowing cooling or heating of the gas stream when passing through the subcompartment to be compensated for. A compartment of this type, which is divided into subcompartments and has dividing walls configured as heat exchangers and also opposing lateral walls of the compartment in the form of heat exchangers, is known from EP 1 104 987 and from the Applicant's application PCT/NL 2007/050370 (application number) which was filed on 13 Jul. 2007 and describes an inventive improvement to heat exchangers of this type. For a more detailed description of heat exchangers of this type, reference is therefore also made to the aforementioned two documents.

For accurately regulating the temperature in each subcompartment, it is in this case advantageous, according to the invention, if the temperature of the gas stream is measured in each case at the downstream side of each subcompartment, if the temperature of the lateral wall or partition wall is regulated in each case at the upstream side of each subcompartment as a function of the temperature measured at the downstream side of the same subcompartment.

If the products treated using the method according to the invention are hatching eggs, it is advantageous, according to the invention, if the eggs are placed in egg receptacles provided on one or more trays, and if each tray is swivelled about a horizontal swivel axis repeatedly, in each case once a turning time interval has elapsed, for turning the eggs. According to the invention, it is in this case particularly advantageous if the turning time interval of the eggs is longer than the reversing time interval of the gas stream. For example, the eggs can be turned 1× per hour (i.e. turning time interval=1 hour), while the gas stream is reversed in its direction 4× per hour (i.e. the reversing time interval=constant 15 minutes or variable, for example successively 10 minutes, 20 minutes, 10 minutes, 20 minutes).

With regard to the embodiment of the gas displacement device and the reversing system in the climate chamber according to the invention, the invention provides at least four alternatives, namely:

the gas displacement device is an air displacement device driven in rotation, and the reversing system is configured for reversing the direction of rotation of the air displacement device;

and/or the gas displacement device comprises: one or more first gas displacement units for circulating the gas stream through the circuit in a first direction, and one or more second gas displacement units for circulating the gas stream through the circuit in a second direction, which second direction opposes the first direction; the reversing system being configured to switch between the first and the second gas displacement units, and wherein in each case one of the two gas displacement units is operative and the other gas displacement unit is inoperative;

and/or the gas displacement device is active in a single direction of displacement and has an inlet side and outlet side, the channel being interrupted at the location of the gas displacement device and having a first and second orifice connected to the gas displacement device, and the reversing system comprising a valve system configured alternately either to connect the inlet side to the first orifice and the outlet side to the second orifice or to connect the inlet side to the second orifice and the outlet side to the first orifice;

and/or the gas displacement device comprises a rotor rotatable around a rotation axis;
wherein the reversing system comprises an essentially closed drum;
wherein the drum is rotatable around a rotation axis between a first and a second position;
wherein a dividing wall divides the drum in a rotor chamber comprising the rotor and an inlet chamber;
wherein the inlet chamber is connected, on the one hand, via an inlet passage through the wall of the drum with the external of the drum, and, on the other hand, via an axial passage through the dividing wall with the rotor chamber;
wherein the rotor chamber is connected via a radial outlet passage through the wall of the drum with the external of the drum;
wherein, viewed in diametral direction transverse to the rotation axis, the inlet passage and the outlet passage lie opposite each other;
wherein, in the first position, the inlet passage opens into a first channel part of the substantially closed channel while the outlet passage opens into a second channel part of the substantially closed channel, and wherein, in the second position, the inlet passage opens into the second channel part while the outlet passage opens into the first channel part.

With a view to accurate regulation of the temperature in the compartment, it is advantageous, according to the invention, if the opposing lateral walls of the compartment are configured as a perforated plate provided with a fluid pipe through which a fluid is to be conveyed, in such a way that each lateral wall forms a heat exchanger with which the temperature of the gas stream passing through said lateral wall can be influenced; if the compartment is divided in the direction of flow into at least two successive subcompartments, adjacent subcompartments each being separated from one another by a partition wall configured as an aforementioned perforated plate provided with a fluid pipe through which a fluid is to be conveyed, in such a way that the partition wall forms a heat exchanger with which the temperature of the gas stream passing through the partition wall is influenced and each partition wall extending substantially transversely to the direction of flow of the gas stream through the compartment; if each partition wall and lateral wall is provided with a sensor system configured to measure the temperature of the gas stream in each case at the downstream side of each subcompartment; if the climate chamber further comprises a temperature regulator configured to couple, in each case when the direction in which the gas stream is circulated is reversed, the sensor system pertaining to each respective partition wall to the heat exchanger of the partition wall or lateral wall, which is in each case positioned upstream, and to regulate the temperature of the lateral wall or partition wall at the respective upstream side of each subcompartment as a function of the temperature measured in each case using the sensor system at the downstream side of the same subcompartment. Each respective subcompartment can thus be adjusted by means of temperature feedback, irrespective of the direction in which the gas stream passes through the subcompartment. According to the invention, the sensor system can in this case very advantageously be configured as, in each partition wall, a passage formed in said partition wall and a temperature sensor provided in said passage at a distance from the edges of said passage. A single temperature sensor can thus be used to measure the temperature of the inflowing gas stream, regardless of the direction from which this gas stream approaches the passage.

All references in the present application to a climate chamber relate to a broad range of climates chambers. Examples include a climate chamber for the ripening of fruit or a climate chamber for the hatching of eggs. In all of these applications, it is important to be able very accurately to regulate the temperature as well as any other parameters.

According to the invention, the term "a climate chamber" refers, in particular, to a means having an internal space (the compartment) that can regulate the temperature in and throughout said internal space with accuracy of ±3° C., more preferably with accuracy of ±1° C. or even more accurately (the term "accuracy" refers in this context to the fact that the greatest difference in temperature between any two locations in said space—the compartment—will be at most the aforementioned accuracy, i.e. at accuracy of ±1° C. this difference in temperature will be at most 2° C.). Use is in this case made of a climate chamber which has insulated walls and in the interior of which a specific desired conditioned environment is maintained.

DESCRIPTION OF THE DRAWINGS

The present invention will be described hereinafter in greater detail with reference to the example illustrated schematically in the drawings, in which.

DETAILED DESCRIPTION OF EMBODIMENTS

Figure 1:
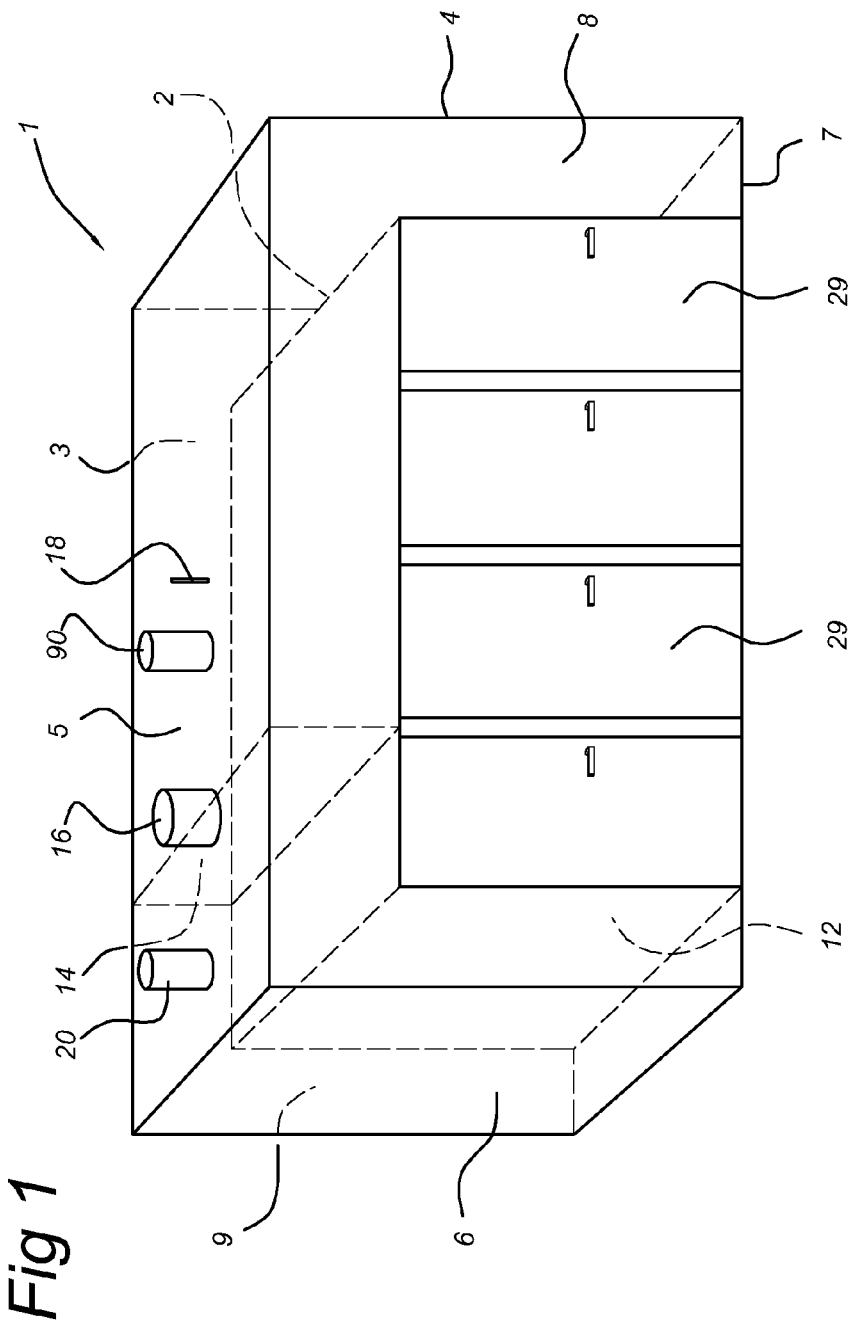
FIG. 1 is a schematic and perspective view of a climate chamber according to the invention.
Figure 2:
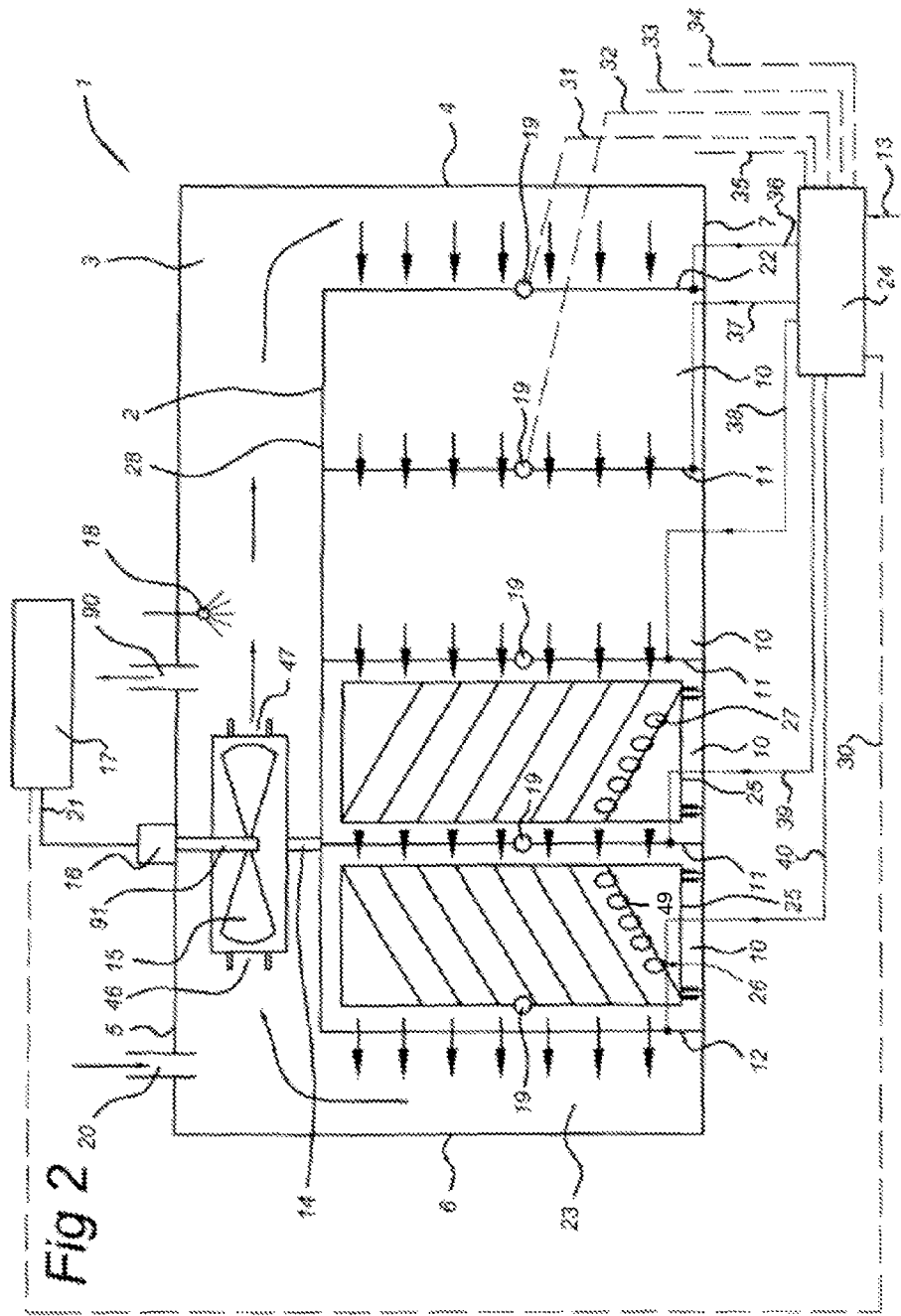
FIG. 2 is a schematic front view of the climate chamber according to FIG. 1, although the front wall thereof has been omitted.
Figure 3:
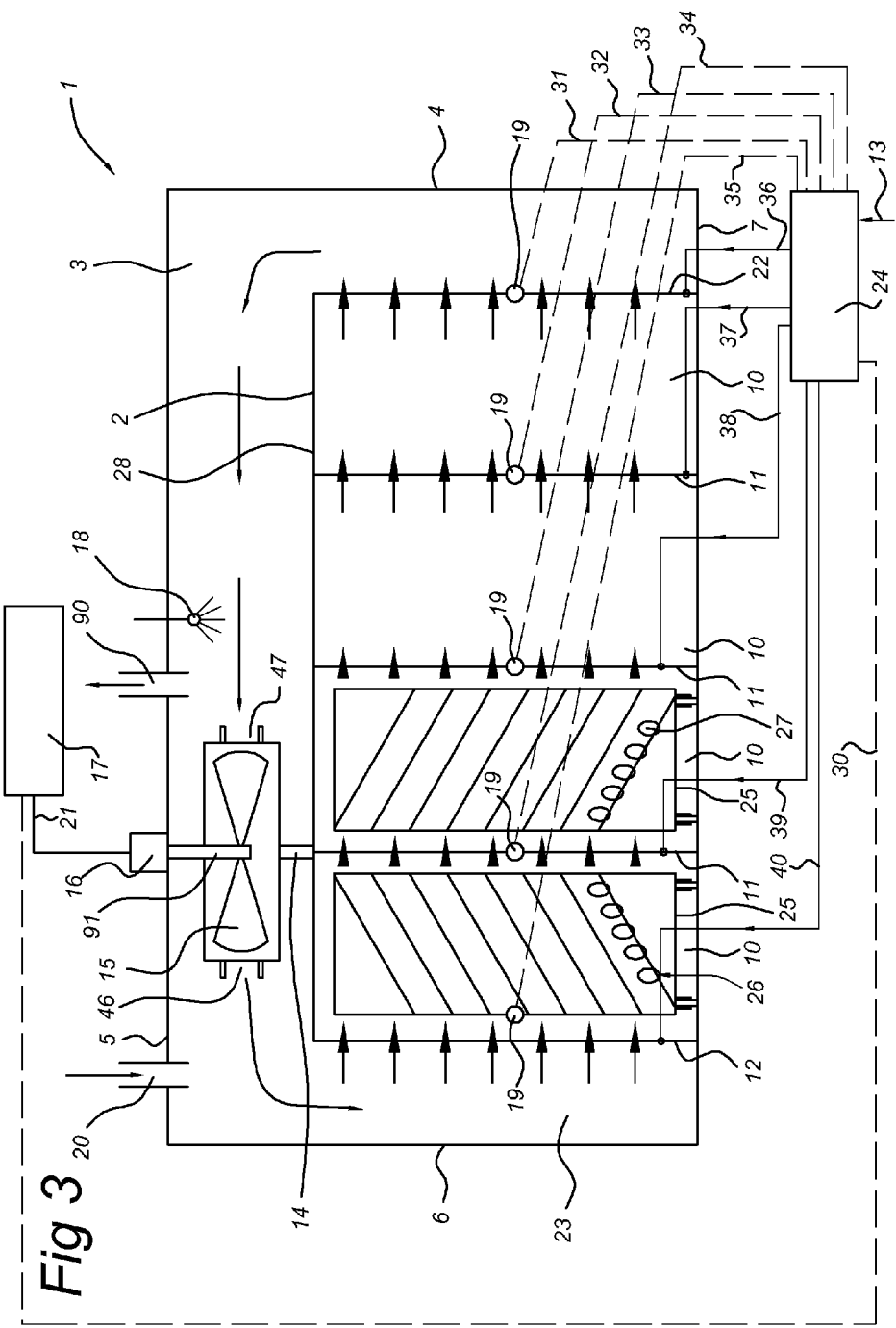
FIG. 3 is a schematic view according to FIG. 2, although the direction in which the gas stream is circulated has been reversed.

FIGS. 1, 2 and 3 show a climate chamber 1 according to the invention. The outside of this climate chamber 1 is delimited by two opposing lateral walls 4, 6, a rear wall 3, an opposing front wall 8, a ceiling 5 and a floor 7. In order to be able to regulate the temperature in the interior of the climate chamber as accurately as possible, these walls, the floor and the ceiling will preferably be insulated in their configuration.

Figure 4:
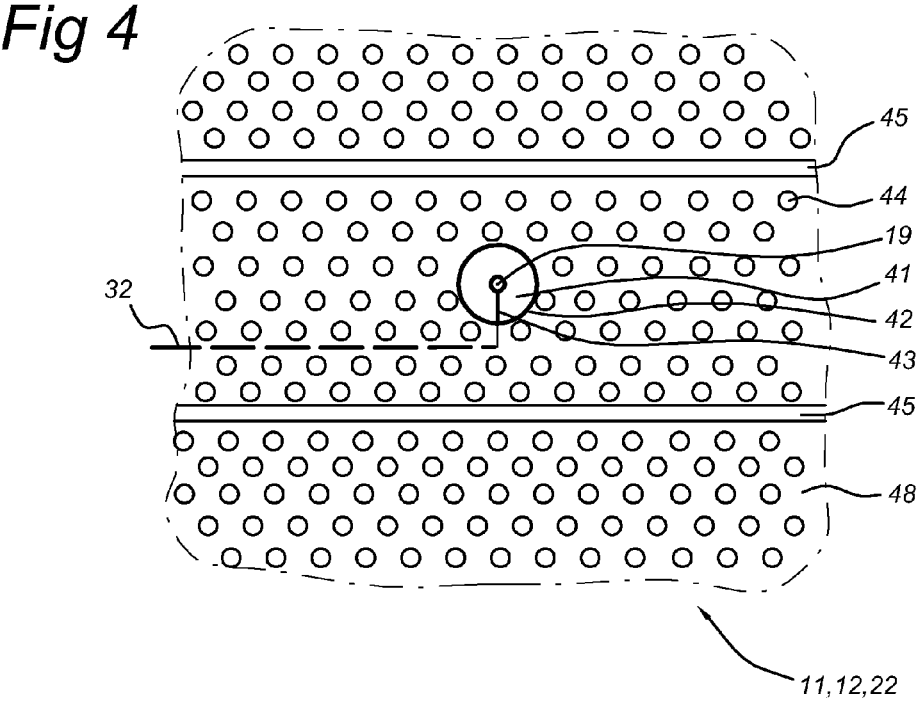
FIG. 4 is a schematic view of a detail of the partition wall from the climate chamber according to FIGS. 1-3.

The climate chamber contains a compartment 2 through which conditioned air is passed so as to be able to control in the compartment 2 the climatological conditions such as the temperature and/or humidity and/or composition of the air, etc. The compartment 2 is delimited by two opposing lateral walls 12, 22, by a rear wall (not shown) which may coincide with the rear wall 3 of the climate chamber, by a ceiling 28 and by a floor which may coincide with the floor 7 of the climate chamber. In this example, the compartment 2 is divided into four subcompartments 10. However, more or fewer subcompartments 10 are also entirely possible. The subcompartments 10 are each respectively separated from one another by a partition wall in the form of a heat exchanger 11. Furthermore, the lateral wall 22 is configured as a heat exchanger and the lateral wall 12 is also configured as a heat exchanger. These heat exchangers 11, 12 and 22 can be configured as described in EP 1 104 987. As is also illustrated in the detail of FIG. 4, this known heat exchanger consists substantially of a metal plate 48 with a large number of perforations 44 and also with fluid pipes 45. In order to be able to influence the temperature of this plate, a fluid, in particular water, having a specific desired temperature is passed through the fluid pipes 45, so the plate 48 is kept at or brought to a specific temperature. The perforated plate 48 is generally positioned vertically upright and has passed through it a—in the case of vertical upright positioning of the plate, horizontal—gas stream which arrives transversely to the face of the plate 48, passes through the perforations 44 in order then to flow onward at the other side of the plate 48. The temperature of the gas stream can be influenced as the gas stream passes through the plate 48. If the temperature of the gas stream is to be increased, the plate 48 will have a higher temperature than the gas stream or be brought to a higher temperature, and if the temperature of the gas stream is to be reduced, the plate 48 will have a lower temperature than the gas stream or be brought to a lower temperature. For a more detailed description of an example of a heat exchanger of this type, reference is made to the aforementioned publication EP 1 104 987 and also to the Applicant's application PCT/NL 2007/050370 (application number) which was filed on 13 Jul. 2007.

As may be seen in FIG. 1, the subcompartments 10 can be accessed via doors 29 provided in the front wall 8. Via the doors 29, there can be introduced into the compartments carriages 25 containing products to be treated or to be stored in the subcompartment 10, such as eggs to be hatched.

The eggs 27 are placed in this case on trays 49 provided with recesses 26 in which the eggs 27 are received. As is known per se in the art, the eggs are turned from time to time, once a turning time interval has elapsed, by altering the angular position of the trays 49 over what is known as a turning angle between two turning positions. The trays 49 on the right-hand carriage from FIG. 2 are depicted in one turning position and the trays on the left-hand carriage from FIG. 2 are depicted in the other turning position. For a further example of a carriage of this type comprising trays which can be swivelled over a turning angle for the turning of eggs during hatching, reference is made to the Applicant's application PCT/NL2006/050054 (application number) which was filed on 13 Mar. 2006.

As is illustrated, in particular, in FIG. 1, the space between the ceiling 28 of the compartment 2 and the ceiling 5 of the climate chamber 1 is divided by a baffle 14. Placed in this baffle 14 is a gas displacement device 15 (not illustrated in FIG. 1) for causing an air stream to circulate as indicated by the arrows in FIG. 2 and FIG. 3. In FIGS. 2 and 3, the gas displacement device 15 is illustrated schematically as a fan. With reference to FIG. 2, the gas displacement device 15 draws at the left-hand side air out of a channel part 23 in order to blow the air out at the right-hand side into a channel part 3. The baffle 14 and/or the gas displacement device 15 thus form, as it were, a division between the channel part 23 and channel part 3. The supply channel 3 extends from the gas displacement device 15 up to the heat exchanger(/lateral wall) 22. Via the perforations in the heat exchanger 22, the air then enters the compartment 2 in order to arrive in the first subcompartment 10, to flow horizontally through this first subcompartment 10, to arrive in the second subcompartment 10 via the heat exchanger 11, in order to flow horizontally through this second subcompartment 10 and to arrive in the third subcompartment via the opposing heat exchanger 11, to flow horizontally through this third subcompartment in order subsequently to return to the fourth subcompartment 10 via the opposing heat exchanger 11. After flowing horizontally through the fourth subcompartment 10, the gas, in particular air, will arrive in the channel part 23 via the lateral wall 12, which is configured as a heat exchanger, in order to flow back to the suction side of the gas displacement device 15 via the channel part.

The direction—clockwise as indicated by the arrows—in which the gas stream is circulated through the gas displacement device in the above-described substantially closed circuit—of the gas displacement device 15, channel part 3, compartment 2 and channel part 23—can be reversed, according to the invention, by means of a reversing system 17, so the gas stream is circulated in the opposite direction. FIG. 3 shows by means of the arrows that the gas stream is in this case circulated in the opposite direction, anticlockwise.

FIGS. 2 and 3 also show a sprayer 18 with which a liquid, for example water, can be sprayed into the channel part 3 in order to be able to increase the humidity of the gas stream. The sprayer 18 could also be provided elsewhere, for example in the channel part 23. It is also possible to provide a sprayer both in the channel part 23 and in the channel part 3.

FIGS. 2 and 3 also show a gas supply 20 via which a gas can be added. This gas to be added may, for example, be fresh air but may also be gas having a specific composition in order, as desired, to be able to adjust or to be able to readjust the composition, for example the $CO_2$ content. This gas supply 20 is provided in the channel part 23. It should be noted that the gas supply 20 can also be provided alternatively or additionally in the channel part 3. Reference 90 indicates a gas discharge.

With reference to FIGS. 2 and 3, the gas displacement device 15 is a gas displacement device of the type driven in rotation. The driving in rotation is carried out by means of an electric motor 16, which drives via shaft 91 the gas displacement device 15. The reversing system 17 is in this embodiment a reversing regulator 17 which is connected to the motor 16 via a signal line 21 in order to be able to reverse the direction of rotation of the motor once a reversing time interval has elapsed. In the state shown in FIG. 2, 46 is the inlet side of the gas displacement device 15 and 47 the outlet side of the gas displacement device. Once the direction of rotation of the motor 16 has been reversed, 46 will—see FIG. 3—be the outlet side and 47 the inlet side of the gas displacement device 15. It will be clear that the gas displacement device 15 can comprise one or more rotating displacement elements, such as rotors, and can optionally also comprise a plurality of motors 16.

Figure 5:
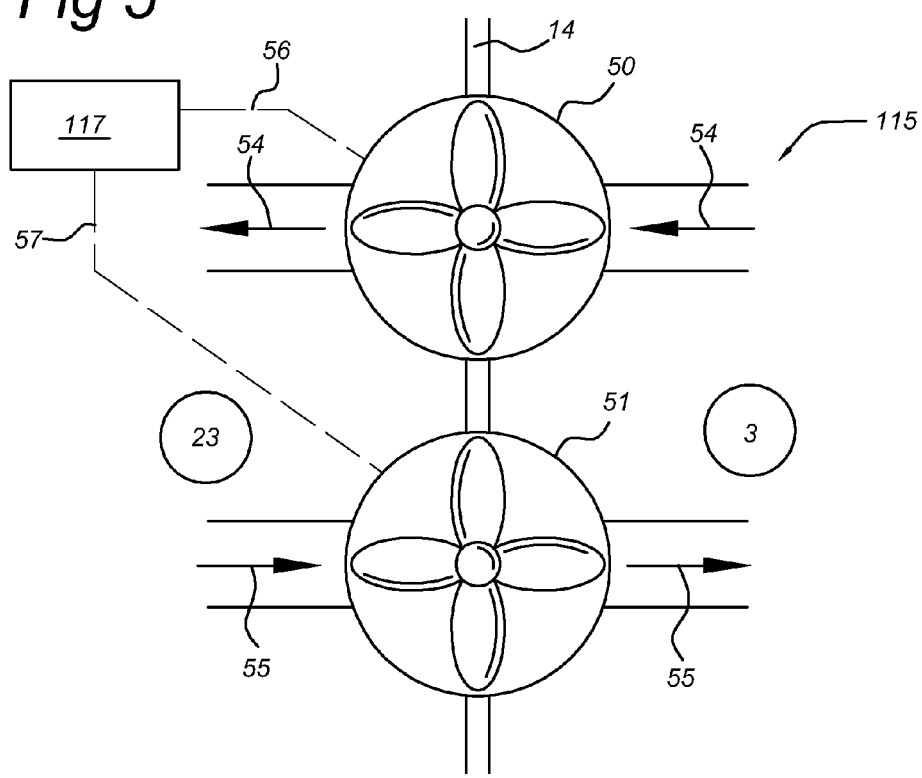
FIG. 5 is a schematic illustration of an alternative embodiment for reversing the direction in which the gas stream is circulated.

FIG. 5 shows highly schematically an alternative gas displacement device 115 with an associated reversing system 117. This gas displacement device 115 and this reversing system 117 can readily be used in the embodiment according to FIGS. 2 and 3 by replacing the gas displacement device 15 and the reversing system 17 with a gas displacement device 115 and reversing system 117 respectively.

The gas displacement device 115 comprises a first gas displacement unit 50 which can circulate the gas stream in a first direction indicated by arrows 54 and a second gas displacement unit 51 which can circulate the gas stream in a second direction indicated by arrows 55. The first and second directions in this case oppose each other. The reversing system 117 is in this case a reversing regulator 117 which is connected to the first gas displacement unit 50 via a signal line 56 and which is connected to a second gas displacement unit 51 via a signal line 57. The reversing system 117 is in this case configured alternately to activate one gas displacement unit and to deactivate the other whenever the direction in which the gas stream is circulated has to be reversed. For clockwise circulation of the gas stream, the second gas displacement unit 51 will then be operative, whereas the first gas displacement unit 50 is inoperative. When switching over to anticlockwise circulation of the gas stream, the first gas displacement unit 50 will then have been activated and the second gas displacement unit 51 will have been deactivated. For switching back to clockwise circulation, the process will be reversed, in other words the first gas displacement unit 50 is activated and the second gas displacement unit 51 is deactivated. This can be repeated, in each case once a reversing time interval has elapsed, permanently or over a specific desired period of time of, for example, a few days.

Figure 6:
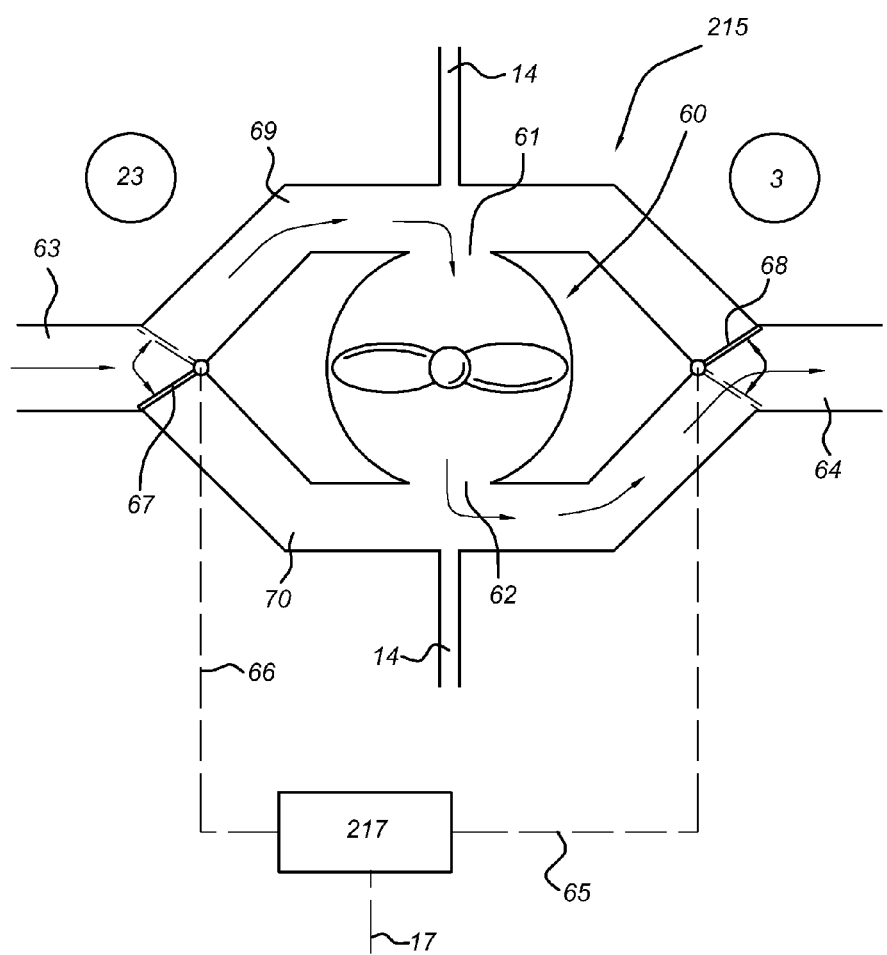
FIG. 6 is a schematic illustration of another alternative embodiment for reversing the direction in which the gas stream is circulated.

FIG. 6 shows highly schematically still another alternative gas displacement device 215 with an associated reversing system 217, 67, 68. This gas displacement device 215 and this reversing system 217, 67, 68 can readily be used in the embodiment according to FIGS. 2 and 3 by replacing the gas displacement device 15 and the reversing system 17 with the gas displacement device 215 and reversing system 217, 67, 68 respectively.

The gas displacement system 215 comprises a gas displacement unit 60 with an inlet side 61 and an outlet side 62. The inlet side 61 is connected both to the first orifice 63 and to the second orifice 64 via a tube 69. The outlet side 62 is connected both to the first orifice 63 and to the second orifice 64 via a tube. The first orifice 63 is positioned in and opens into the channel part 23 and the second orifice is positioned in and opens into the channel part 3. The gas displacement unit 60 is in each case active in the same direction, so the inlet side 61 and the outlet side 62 are invariable. The reversing system 217, 67 and 68 comprises in this case a reversing regulator 217 and two valves 67 and 68. The reversing regulator is connected to the valves 68 and 67 respectively via signal lines 65 and 66 in order to be able to operate these valves. The valve 68 is provided in the second orifice 64 and the valve 67 is provided in the first orifice 63. In the position of the valves 67 and 68 shown in FIG. 6, the gas displacement unit 60 will displace the gas as indicated by arrows in FIG. 6. In the case of integration into the embodiment of FIGS. 2 and 3, the gas stream is then circulated clockwise as shown in FIG. 2. As a result of changing both valves 67 and 68 to the position indicated by broken lines in FIG. 6, a) the orifice 64 will be connected to the tube 69 (whereas the passage between the orifice 63 and tube 69 is closed), so gas will be drawn from the channel part 3; and b) the orifice 63 will be connected to the tube 70 (whereas the passage between the orifice 64 and tube 70 is closed), so gas will be blown out into the channel part 23. The gas stream will then be circulated anticlockwise as shown in FIG. 3.

Figure 7A:
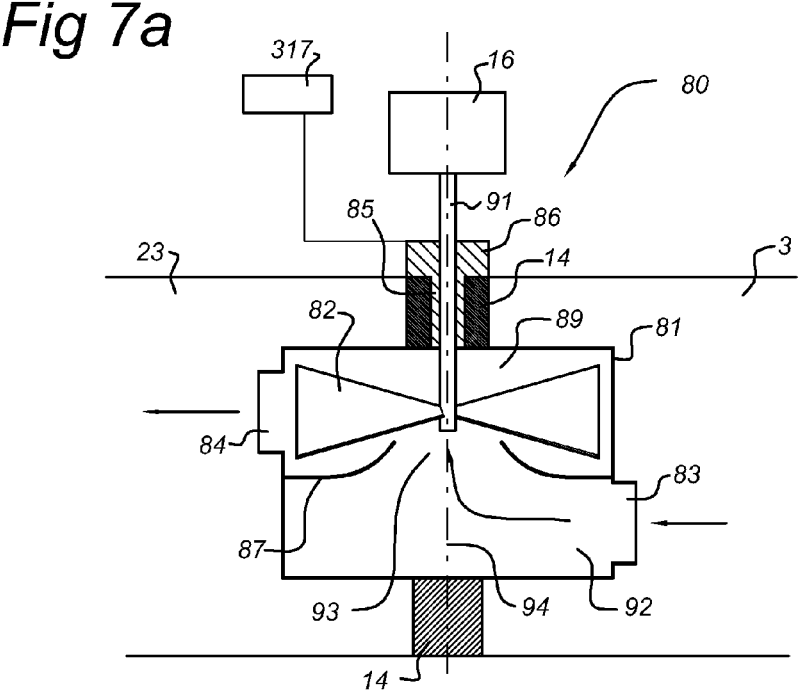
FIG. 7 is a schematic illustration of still another alternative embodiment for reversing the direction in which the gas stream is circulated.
Figure 7B:
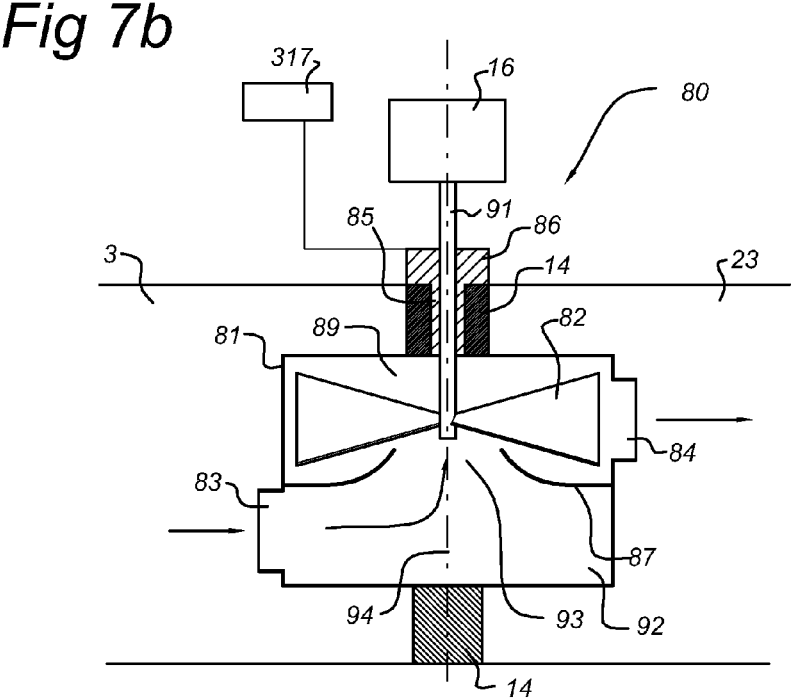

FIG. 7 shows very schematically still another alternative gas displacement device 80 with a reversing system 81 belonging thereto. The gas displacement device comprises a rotor 82 rotatable around an shaft 91, also called rotor axis 91. The reversing system comprises an essentially closed drum 81. A dividing wall 87 divides the drum 81 in a rotor chamber 89 and an inlet chamber 92. The rotor 82 is arranged in the rotor chamber 89. The dividing wall 87 is at some place, especially in the middle, provided with a passage 93 which provides a connection between the inlet chamber 92 and the rotor chamber 89. The inlet chamber 92 is connected via an inlet passage 83 through the wall of the drum 81 with the external of the drum. The rotor chamber 89 is via an outlet passage 84 through the wall of the drum 81 connected with the external of the drum. Controlled by a regulator 317 and by means of a reversing unit 86, the drum is rotatable around a rotation axis 94 between a first position and a second position. Viewed in the direction transverse to the rotation axis 94, the inlet passage 83 and outlet passage 84 lie diametrically opposite each other. The dividing baffle 14, in which the gas displacement device is arranged, divides the substantially closed channel 3, 23 in a first channel part 3 at the right of the dividing baffle 14 and a second channel part 23 at the left of the dividing baffle 14. In the first position of the drum, shown in FIG. 7a, the inlet passage 83 opens into the first channel part 3 and the outlet passage 84 opens into the second channel part 23. In the second position of the drum, shown in FIG. 7b, the inlet passage 83 opens into the second channel part 23 and the outlet passage 84 opens into the channel part 3. During rotation of the drum between the first position and the second position, the rotor can continue rotating uninterrupted. The air is drawn in via the inlet chamber 92 by the rotor 82 and expelled in a direction transverse to the rotation axis 94 of the drum (i.e. in a radial and/or tangential direction with respect to the drum). By simply rotating the drum, the direction of circulation of the gas stream is reversed. As such the rotor can be of many types. Preferably, the rotor 82 will be of a type drawing in from an axial direction and discharging transverse to this axial direction.

Returning to FIGS. 2, 3 and 4, the regulation of the heat exchangers 11, 12, 22 will be described hereinafter in greater detail.

FIG. 4 shows as a detail a portion of a heat exchanger 11, 12, 22 where a temperature sensor 19 is provided. This temperature sensor 19 is positioned, carried on an arm, in a wide passage 41 through the plate. The temperature sensor 19 is in this case arranged in the face of the plate and at a distance from the edge 42 of the passage 41. The passage 41 is in this case configured so as to be sufficiently wide around the temperature sensor that the portion of the gas stream that passes through this passage is heated only slightly or not at all by the heat exchanger 11, 12, 22 as it passes. The phrase "only slightly or not at all" means in the present context that the change in temperature undergone by this portion of the gas stream is at most 20% of the change in temperature which the gas stream as a whole undergoes on average as it passes through this heat exchanger. With the temperature sensor 19 arranged in this way, it is possible, irrespective of the direction in which the gas stream approaches the heat exchanger, to determine the temperature of the approaching gas stream. A minimum number of temperature sensors is thus sufficient to regulate or adjust the heat exchanger provided upstream of a subcompartment 10 by feeding back the temperature of the gas stream downstream of that compartment. It is possible to continue using the same temperature sensors when reversing the gas stream; the signals originating from the temperature sensors have merely to be fed through to the regulator of a different heat exchanger. The alternative would be to provide a temperature sensor at opposing sides of the plate/heat exchangers 11 and to use or, conversely, not to use this temperature sensor as a function of the inflow direction of the gas stream.

FIGS. 2 and 3 show a regulator 24 for the heat exchangers 11, 12 and 22. 13 denotes the feed stream of cooling/heating medium, usually water. 36, 37, 38, 39 and 40 denote the feed pipes with which the medium is supplied to the respective heat exchangers. The return pipes, with which the medium is discharged from the heat exchangers, are not shown in the present document. However, a person skilled in the art will be able to add these. The regulator 24 is provided with a regulating valve (not shown) for each feed pipe 36-40 in order to be able to adjust the flow rate of medium that is allowed to pass. In order to be able to readjust the heat exchangers by means of feedback for each compartment, each heat exchanger is provided with a temperature sensor 19, the signal line 31, 32, 33, 34 and 35 of which is in each case connected to the regulator 24.

In the situation of FIG. 2, the heat exchanger 22 will be controlled as a function of the temperature signal received via the signal line 32, the right-hand heat exchanger 11 will be controlled as a function of the temperature signal received via the signal line 33, the central heat exchanger 11 will be controlled as a function of the temperature signal received via the signal line 34, and the left-hand heat exchanger 11 will be controlled as a function of the temperature signal received via the signal line 35. The heat exchanger 12 and the temperature sensor 19 connected to the signal line 31 can in this case be inoperative, although generally the heat exchanger 12 will be kept in operation in such a way that once the direction of the gas stream has been reversed, this heat exchanger 22 is predominantly already up to temperature. It is also entirely conceivable to control the heat exchanger 12 as a function of the temperature signal received via the signal line 31.

In the situation of FIG. 3, the heat exchanger 12 will be controlled as a function of the temperature signal received via the signal line 34, the left-hand heat exchanger 11 will be controlled as a function of the temperature signal received via the signal line 33, the central heat exchanger 11 will be controlled as a function of the temperature signal received via the signal line 32, and the right-hand heat exchanger 11 will be controlled as a function of the temperature signal received via the signal line 31. The heat exchanger 22 and the temperature sensor 19 connected to the signal line 35 can in this case be inoperative, although generally the heat exchanger 22 will be kept in operation in such a way that once the direction of the gas stream has been reversed, this heat exchanger 22 is predominantly already up to temperature. In this case too, it is also entirely conceivable to control the heat exchanger 22 as a function of the temperature signal received via the signal line 35.

LIST OF REFERENCE NUMERALS USED IN THE DRAWINGS

1 Climate chamber
2 Compartment
3 Channel part
4 Lateral wall of the climate chamber
5 Ceiling of the climate chamber
6 Lateral wall of the climate chamber
7 Floor of the climate chamber
8 Front wall of the climate chamber
9 Rear wall of the climate chamber
10 Subcompartment
11 Heat exchanger
12 Heat exchanger
13 Fluid supply
14 Dividing baffle
15 Gas displacement device
16 Motor
17 Reversing regulator
18 Sprayer
19 Temperature sensor
20 Gas supply
21 Signal line
22 Heat exchanger
23 Channel part
24 Regulator for heat exchangers
25 Carriage
26 Egg receptacle
27 Egg
28 Ceiling of the compartment
29 Door
30 Signal line
31 Signal line
32 Signal line
33 Signal line
34 Signal line
35 Signal line
36 Fluid supply of the heat exchanger
37 Fluid supply of the heat exchanger
38 Fluid supply of the heat exchanger
39 Fluid supply of the heat exchanger
40 Fluid supply of the heat exchanger
41 Passage
42 Edge of the passage
43 Carrier
44 Perforation
45 Fluid pipe in the heat exchanger
46 Inlet/outlet
47 Inlet/outlet
48 Plate
49 Tray
50 First gas displacement unit
51 Second gas displacement unit
52 Signal line
53 Signal line
54 Arrow
55 Arrow
56 Signal line
57 Signal line
60 Gas displacement device
61 Inlet side
62 Outlet side
63 First orifice
64 Second orifice
65 Signal line
66 Signal line
67 Valve
68 Valve
69 Tube
70 Tube
80 reversing system
81 drum
82 rotor
83 inlet passage
84 outlet passage
86 reversing unit
87 dividing wall
89 rotor chamber
90 Gas discharge
91 shaft
92 inlet chamber
93 passage
94 rotation axis
115 Gas displacement device
117 Reversing system
215 Gas displacement device
217 Reversing regulator
317 regulator

What is claimed is:

1. A method for treating products, said method comprising:
providing a climate chamber comprising a substantially closed compartment having two opposing lateral walls provided with at least one passage, and a substantially closed channel which extends around the outside of the compartment and connects one of said lateral walls to the other of said lateral walls in order to form together with the compartment a substantially closed circuit;
placing the product in the climate chamber; and then circulating a conditioned gas stream through the circuit,
wherein in the direction in which the conditioned gas stream is circulated through the circuit is reversed repeatedly, in each case once a reversing time interval has elapsed,
wherein the gas stream passes through the compartment predominantly from one lateral wall to the other lateral wall,
wherein the opposing lateral walls are configured as a perforated plate provided with a fluid pipe through which a fluid is conveyed, in such a way that each lateral wall forms a heat exchanger with which the temperature of the conditioned gas stream passing through said lateral wall can be influenced.

2. The method of claim 1, wherein the reversing time interval is less than 2.5 hours.

3. The method of claim 1, wherein the reversing time interval is less than 1 hour.

4. The method of claim 1, wherein the reversing time interval is not greater than 30 minutes.

5. The method of claim 1, wherein the reversing time interval is not greater 20 minutes.

6. The method of claim 1, wherein the reversing time interval is at least 1 minute.

7. The method of claim 1, wherein the reversing time interval is at least 5 minutes.

8. The method of claim 1, wherein the reversing time interval is at least 7.5 minutes.

9. The method of claim 1, wherein the direction of the gas stream is reversed over at least a range of between 4 to 10 hours, at one of a fixed and a variable reversing frequency.

10. The method of claim 1, wherein the direction of the gas stream is reversed over at least a range of between 1 to 4 days, at one of a fixed and a variable reversing frequency.

11. The method of claim 1, wherein the compartment is divided in the direction of flow into at least two successive sub-compartments, adjacent sub-compartments each being separated from one another by a partition wall configured as the perforated plate provided with a fluid pipe through which a fluid is conveyed, in such a way that the partition wall forms a heat exchanger with which the temperature of the gas stream passing through the partition wall is influenced, the partition wall extending substantially transversely to the direction of flow of the gas stream through the compartment.

12. The method of claim 11, wherein the temperature of the conditioned gas stream is measured in each case at a downstream side of each sub-compartment; the temperature of the lateral wall or partition wall at the upstream side of each sub-compartment being regulated in each case as a function of the temperature measured at the downstream side of the same sub-compartment.

13. The method of claim 1, wherein the treated products are hatching eggs, wherein the treatment further comprises at least one of a pre-hatching and hatching-out of the hatching eggs.

14. The method of claim 13, wherein the hatching eggs are placed in egg receptacles provided on at least one trays, wherein each tray is swivelled about a horizontal swivel axis repeatedly, in each case once a turning time interval has elapsed, for turning the hatching eggs.

15. The method of claim 14, wherein the turning time interval of the eggs is longer than the reversing time interval of the gas stream.

* * * * *